(12) United States Patent
Gilling

(10) Patent No.: US 6,445,830 B1
(45) Date of Patent: Sep. 3, 2002

(54) METHOD AND APPARATUS FOR CORRECTION OF A DISCRETE PIXEL IMAGE

(75) Inventor: Christopher J. Gilling, Pewaukee, WI (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/172,979

(22) Filed: Oct. 14, 1998

(51) Int. Cl.⁷ .............................. G06T 5/00; G06T 5/10
(52) U.S. Cl. ...................... 382/254; 382/128; 382/275; 382/260
(58) Field of Search ................................ 382/260, 264, 382/254, 275, 128; 600/410

(56) References Cited

PUBLICATIONS

Wright, G.A., "Magnetic Resonance Imaging", IEEE Signal Processing Magazine, Jan. 1997, pp. 56–66.*

\* cited by examiner

*Primary Examiner*—Scott Rogers
(74) *Attorney, Agent, or Firm*—Fletcher, Yoder & Van Someren

(57) ABSTRACT

A discrete pixel image field of view is expanded by correction of filtered and processed image data. The raw image data is processed through at least one continuous domain filter. Roll off at limits of a linear range of the filter result in loss or degradation of image data in the transition region. The filtered image data is digitized and the resulting values are stored in discrete frequency value bins. Correction values are applied to the image data in the discrete bins of the transition region to correct the filter roll off. At least a portion of the corrected data is added to the field of view data employed in the image reconstruction. The technique permits as much as several percent of the field of view to be recuperated from the transition regions.

29 Claims, 4 Drawing Sheets

METHOD AND APPARATUS FOR CORRECTION OF A DISCRETE PIXEL IMAGE

FIELD OF THE INVENTION

The present invention relates generally to the field of discrete pixel imaging systems, such as magnetic resonance imaging systems. More particularly, the invention relates to a technique for correcting or adjusting portions of image data to compensate for effects of image data filtration and expand to the field of view in such images.

BACKGROUND OF THE INVENTION

A variety of systems are known and presently in use for producing discrete pixel images. Such systems generally collect raw image data from a subject of interest over a desired imaging area, and convert the collected raw image data to data which can be used to reconstruct an image. In magnetic resonance imaging systems, for example, spins of gyromagnetic material in a subject of interest are altered and spatially encoded to produce emissions which are detected during a data acquisition phase of imaging. The sensed signals are filtered and further processed to produce digital data for each individual volume element or voxel in a desired slice of the subject. The voxel data is then processed to produce a corresponding set of discrete picture element or a pixel data which can be used to reconstruct a two-dimensional image. The resulting images may be used by radiologists, attending physicians, and clinicians to diagnose and treat physical conditions of patients. Similar processes are also employed outside the medical imaging field in an increasing number of applications.

Features of interest, such as anatomical features, are imaged in magnetic resonance imaging systems by displaying the frequency content of received echo signals from the gyromagnetic material across a display area or image matrix. The position of the pixel data within the image is directly related to the frequency of the sensed signal. This correlation is generally known in the art as frequency encoding. The unique frequency for each position, i.e., the frequency encoding, is created by varying gradient magnetic fields produced by gradient coils in the imaging system. While the emissions from the subject are sensed in real time, the resulting time domain data must therefore be transformed to the frequency domain to assign to the data the proper location in the subject. This transformation is performed following band limit filtering on the raw image signals.

A number of image quality parameters typically interact to define band limit filtering requirements. Such parameters include alias content, brightness or intensity uniformity, and signal-to-noise ratio. Aliasing, for example, tends to replace energy into the discrete band bins used to digitally reconstruct the image, and can thus result in image artifacts, such as "ghosting". Alias content may be adjusted by moving a low pass filter limit or corner to sufficiently low frequencies to eliminate the undesirable aliasing. Because continuous domain or analog filters are employed in the image processing the corner of the low pass filter limit is not sharp, but slopes downwardly near the limit of the useful frequency range. A transition region is therefore established at the higher frequencies, i.e. beyond the corner transition of the filter. In typical systems, data in portions of the frequency band beyond the limit of the low pass filter, found in the transition region, is discarded in a process commonly referred to as stop band rejection. While this practice reduces the incidence of image artifacts, it also reduces the field of view of the image due to the relationship between frequencies of the signals and positions in the image.

Magnetic resonance imaging systems of conventional design require a wide range of imaging bandwidths. Current bandwidths in such systems range from 1 MHz (+/−500 KHz) to approximately 4 KHz. As mentioned above, bandwidth limiting filters are used in such systems in various combinations. In addition to the continuous domain or analog of filters mentioned above, discrete or digital domain filters are also employed following analog-to-digital conversion of the image data. In general, it is desirable to maintain filter parameters such as pass band ripple, transition bandwidth, stop band rejection and so forth relatively constant for all output bandwidths. This provides bandwidth independence for image quality parameters. However, such uniformity is increasingly difficult to realize. For example, in the discrete domain, the transition width provided by a fixed tap length FIR will essentially double with each bandwidth halving in a fixed analog-to-digital rate sample stream. As a result, for low bandwidths a prohibitively large number of taps are required to provide performance equivalent to that at higher bandwidths. Similar performance limitations exist for continuous domain filters.

Due to these limitations in the design of both discrete and continuous domain filters the amount of information filtered out by transition bandwidths and stop band rejection can only be reduced at considerable cost. By consequence, conventional imaging systems typically simply reduce the image field of view by use of a portion of the frequency bandwidth, sacrificing data rejected within the transition region at edges of the filter beyond the low pass filter limit. In many situations, the field of view is thereby reduced by several percent.

It would be useful therefore, to provide a technique for recuperating at least a portion of the image data found in transition regions of the system bandwidth rejected following image data filtering. In particular, there is a need for an improved technique for processing discrete pixel images which economically expands the useful field of view, effectively recuperating such data without the need for a more expensive filter design.

SUMMARY OF THE INVENTION

The invention provides a novel technique for correcting discrete pixel image data designed to respond to these needs. The technique may be applied to a variety of imaging systems wherein the field of view is limited by filters, particularly continuous domain or analog filters. The technique is particularly well suited for use in magnetic resonance imaging systems wherein continuous domain filtering is performed on raw image data prior to conversion of the data to a digital domain for further processing. In accordance with one aspect of the invention, acquired image data is filtered through at least one continuous domain filter to produced filtered data. The filtered data is compiled into discrete frequency value bins including a primary region and a transition region. In general, the transition region is at least partially defined by a non-linear region of the continuous domain filter. The filtered data may be compiled into a large number of such discrete value bins, depending upon the image resolution, field of view, and so forth. A plurality of correction gains are applied to values of the discrete value bins in the transition region to correct the image data.

The filtering of the image data prior to correction may be accomplished in various manners. In one embodiment contemplated by the invention, both continuous and discrete domain filtering is performed prior to the correction of the values in the transition region. Moreover, image data processing prior to the correction step may be performed in the time domain, the frequency domain, or both, such as in magnetic resonance imaging systems wherein image data is acquired in the time domain and subsequently transformed to the frequency domain for image reconstruction. The technique permits expansion of the image field of view in a very economical manner. In certain instances, the field of view is expanded on the order of several percent through the correction technique, while avoiding image artifacts or similar degradation in the imaging process.

DETAILED DESCRIPTION OF THE INVENTION

Figure 1:
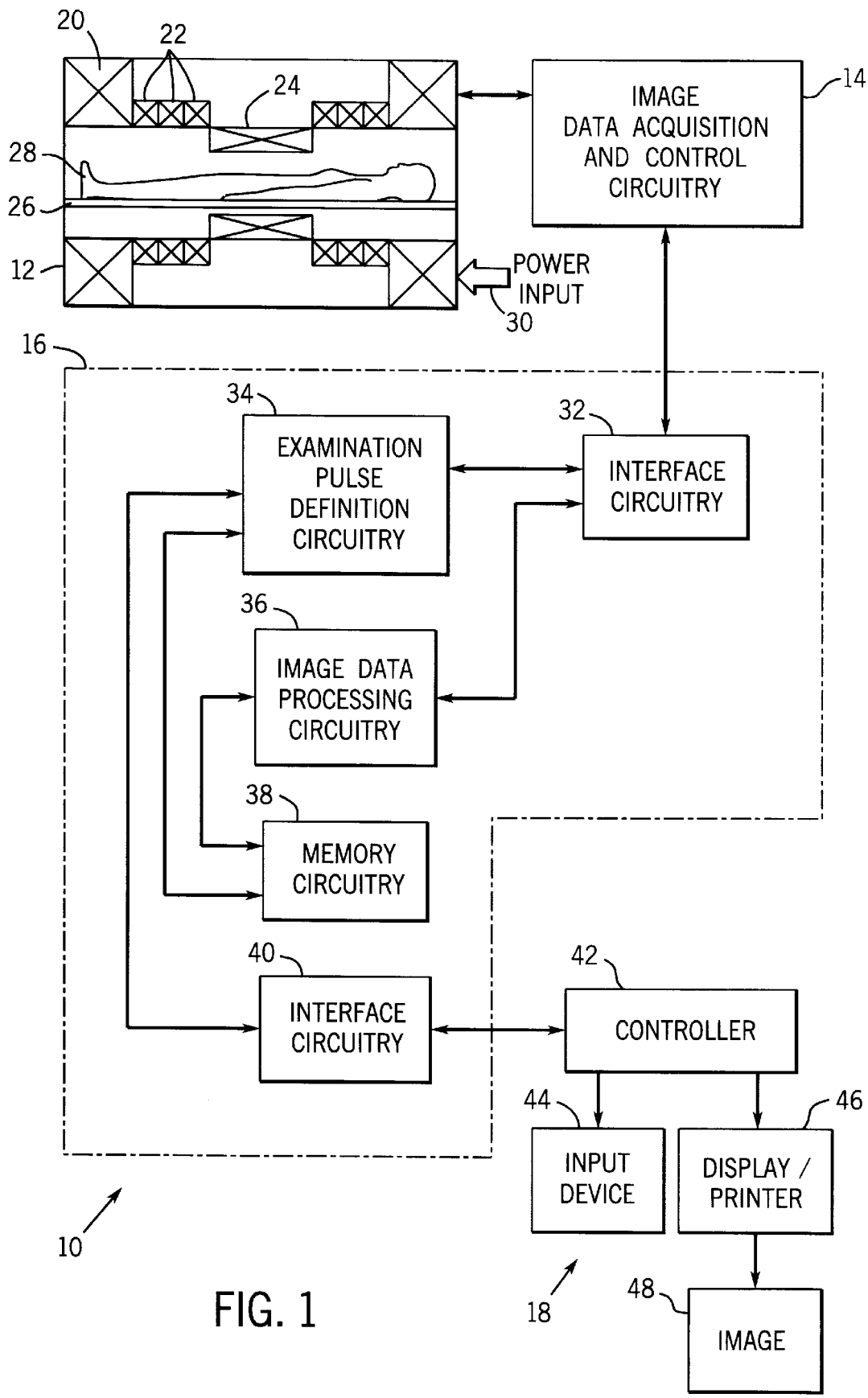
FIG. 1 is a diagrammatical representation of a magnetic resonance imaging system including processing circuitry for filtering acquired image data in accordance with certain aspects of the present technique.

Turning now to the drawings and referring first to FIG. 1, an exemplary imaging system is illustrated and designated by the reference numeral 10. In the embodiment of FIG. 1, imaging system 10 is a magnetic resonance imaging system including a scanner 12, image data acquisition and control circuitry 14, system control and processing circuitry 16, and an operator interface 18. Scanner 12, in turn, includes coil assemblies for selectively generating controlled magnetic fields used to select a portion of a subject of interest for imaging, as well as coils for exciting gyromagnetic materials in the subject and for sensing resulting emissions. In particular, scanner 12 includes a primary coil 20, which will typically include a superconducting magnet coupled to a cryogenic refrigeration system (not shown). Coil 20 generates a highly uniform magnetic field along a longitudinal axis of the scanner. A series of gradient coils 22 generate controllable gradient fields having desired orientations with respect to the subject of interest. In particular, as will appreciated by those skilled in the art, gradient coils 22 are capable of creating field for selecting an image slice, orienting the image slice, and frequency encoding gyromagnetic material within the slice to produce the desired image from frequency encoded data. One or more radio frequency transmitting and receiving coils 24 are provided for exciting the gyromagnetic material and for detecting emissions from the material during data acquisition phases of operation of the system. A patient table 26 is positioned within scanner 12 to support a subject 26, such as a human patient.

In the embodiment illustrated in FIG. 1, operation of gradient coils 22 and transmitting/receiving coil 24 is controlled by image data acquisition and control circuitry 14. In general, circuitry 14 receives pulse sequence descriptions from control circuit 16, notably through interface circuitry 32. Such pulse sequence descriptions will generally include digitized data indicative of controlled pulses applied to coils 22 and 24 during excitation and data acquisition phases of imaging. Fields generated by the coils excite gyromagnetic material within the subject 28 to cause emissions from the material. Such emissions are detected by coil 24 and are transmitted to image data acquisition and control circuitry 14. Circuitry 14 then filters the detected signals as described more fully below, and transmits the filtered signals to control circuit 16 via interface circuitry 32. Power for operation of scanner 12 is provided by a power supply as indicated generally at reference numeral 30 in FIG. 1.

In addition to interface circuitry 32, control circuit 16 includes examination pulse definition circuitry 34, image data process circuitry 36, memory circuitry 38, and interface circuitry 40 for communicating with operator interface 18. Examination pulse definition circuitry 34, which may generally be defined by appropriate code within one or more central processing units, signal processors or similar circuitry within image data processing circuitry 36. Circuitry 34 serves to define the digital pulse sequences to be executed by the coils of scanner 12 in accordance with pre-established examination protocols.

Examination pulse definition circuitry 34 may draw such pulse sequence definitions from memory circuitry 38. Moreover, such pulse definitions may be modified or adapted depending upon system configurations stored within memory circuitry 38. The pulse definitions established by circuitry 34 are transmitted to image data acquisition and control circuitry 14 through interface circuitry 32. Image data processing circuitry 36 receives processed image data from interface circuitry 32, and further filters and processes the image data. In particular, circuitry 36 performs Fourier transforms and filtering functions on the data to convert the time domain data acquired by the scanner to frequency domain data for reconstruction into a discrete pixel image. Data processed by circuitry 36 is typically stored in memory circuitry 38 for subsequent retrieval and reconstruction into a usable image. Moreover, memory circuitry 38 may store configuration data employed by image data processing circuitry 36 during such image reconstruction.

Interface circuitry 40 permits system control circuit 16 to receive examination commands, protocols, configuration data, and so forth from operator interface 18. Accordingly, interface circuitry 40 is linked to an operator interface controller 42, which may include a general purpose or application-specific computer. Controller 42 will typically be programmed to received and recognize operator image requests, configuration values, and the like from an operator input device 44, such a conventional computer keyboard. Such system of configurations, processed images and so forth are made available to the system operator via display and interface devices as indicated generally at reference numeral 46. A user interface is preferably provided on the display for facilitating the operator's control of the imaging system, such as via on-screen menus and the like. Finally, operator interface 18 preferably provides a printer, camera or similar output device for producing an image 48 on a tangible medium, such as photographic film.

Figure 2:
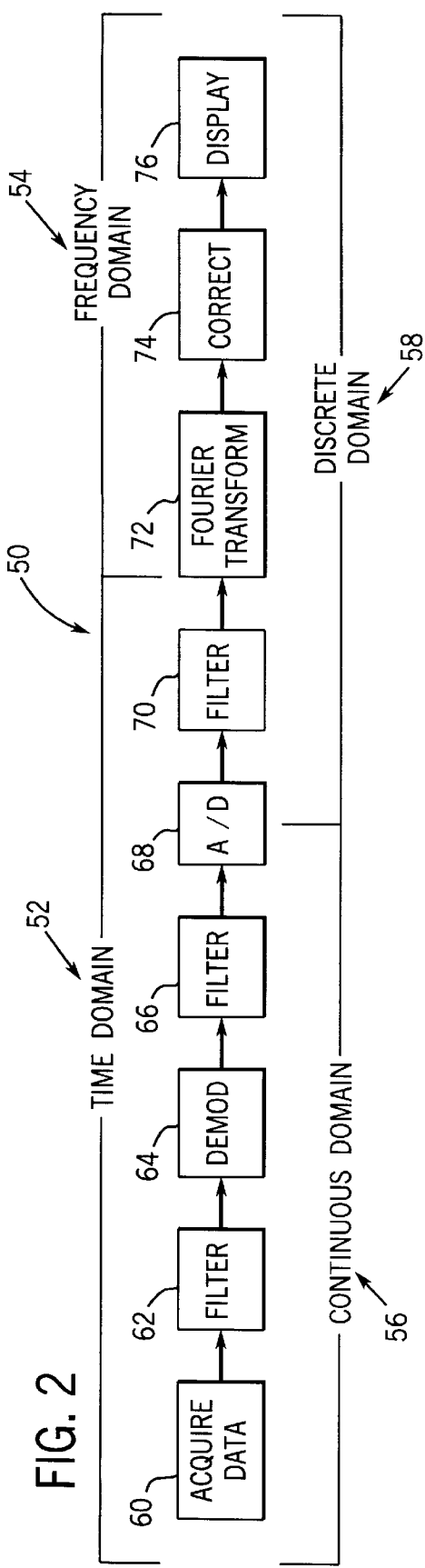
FIG. 2 is a diagrammatical representation of exemplary steps in image data filtration, including correction for portions of a transition region in the data.

FIG. 2 illustrates exemplary steps in image data acquisition and processing through display of the reconstructed image. As indicated in FIG. 2, the steps in the image data processing, represented generally by a reference numeral 50, include steps performed on time domain data, as indicated by reference numeral 52, and steps performed on frequency domain data following 2D Fourier transformation, as indicated by reference numeral 54. Moreover, the signal processing steps illustrated in FIG. 2 are generally carried out in both the continuous and discrete domains. More particularly, prior to conversion from analog data to digital data, a series of steps is carried out in the continuous domain as indicated by reference numeral 56. Following conversion to digital data, subsequent processing is carried out on data in the discrete domain, as indicated by reference numeral 58.

The continuous and time domain processing shown in FIG. 2 begins with data acquisition as indicated at step 60. As mentioned above and as will be appreciated by those skilled in the art, in a magnetic resonance imaging system of the type represented in FIG. 1, step 60 includes generation of pulses via gradient coils 22 and one or more rf coils 24. These may include various types of acquisition preparation slice select, encoding and acquisition signals. The pulse sequence definitions will also include commands for detecting emissions form the subject as a result of the various fields and pulses. One of various types of signal detection processes is employed to sense such emissions from the subject, and to encode resulting signals depending upon the image protocol.

Following this data acquisition stage, the acquired signals are filtered initially by continuous domain (i.e., analog) filters to limit the bandwidth of the sensed signals in a manner generally known in the art. Such filtering may be performed by the image data acquisition and control circuitry 14 discussed above with reference to FIG. 1. Following this filtration, the analog signals are demodulated at step 64 to reduce the frequency of the analog signals to a desired sample rate. At step 66, the demodulated signals are again filtered to limit the bandwith to a desired range. Finally, at step 68, the filtered analog signals are converted to digital values by an analog-to-digital converter. This conversion may typically take place in circuitry 14, and produces a set of digitized time-domained data which is transmitted to image data processing circuitry 36 in control circuit 16 via interface circuitry 32 for subsequent processing. Within image data processing circuitry 36, various additional signal processing and enhancement procedures are implemented, such as digital demodulation, peak value correction, filtering and so forth. For example, as indicated at step 70 in FIG. 2, digital filtration is performed on the data set, such as again to limit the bandwidth of the data to a desired range.

Through step 70, the time-domain data processed is commonly referred to as "k-space" data, which is converted to the frequency domain for reconstruction of the usable image. Thus, as indicated at step 72, a two-dimensional Fourier transform is performed on the filtered digital data to obtain a series of values which may be arranged in rows and columns across the image area or matrix in accordance with the frequency/position encoding implemented by the scanner. The resulting frequency domain data set may be further filtered and enhanced such as to increase signal-to-noise ratios, reduce image artifacts, enhance certain recognizable features within the image, and so forth.

In accordance with the present technique, the image data is corrected as indicated at step 74 to extract useful data from marginal transition regions at the extremities of the image field of view. The correction performed at step 74, is described in greater detail below. Following correction at step 74, the filtered and corrected image data is stored, such as in memory circuit 38 discussed above with reference to FIG. 1. Based upon this stored image data, a discrete pixel image may be reconstructed by circuit 16 and displayed as indicated at step 76.

Figure 3:
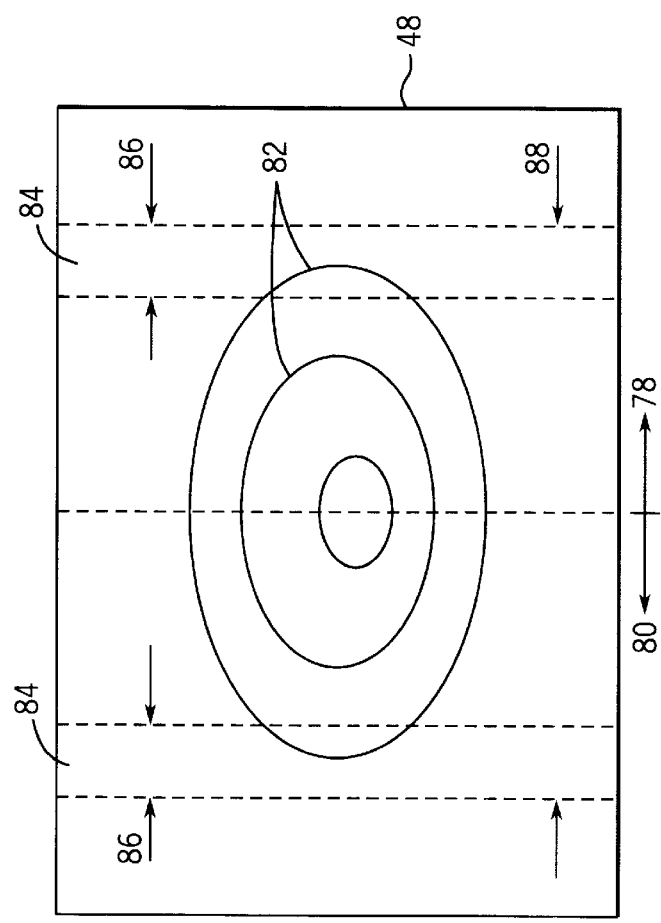
FIG. 3 is an exemplary image created via the system of FIG. 1 and through the filtration of FIG. 2, illustrating an image slice through a subject over a field of view defined by frequency encoded data.

FIG. 3 illustrates generally a discrete pixel image produced through the data acquisition and processing steps of FIG. 2. As shown in FIG. 3, image 48 includes data which is processed and displayed on either side 78 and 80 of an image centered-line. In particular, image 48 includes a portion 78 to the right of the center line corresponding to a high frequency band of image data, and a portion 80 to the left of the center line corresponding to a low frequency band of data. As will be appreciated by those skilled in the art, the exemplary image reconstructed as shown in FIG. 3 will comprise a matrix of pixels having intensities that provide contrast between features 82 of interest in the subject. In an MR image, for example, the image features 82 will typically include internal anatomical features of a patient defined by light and dark contrasting pixels in the image matrix.

The high and low frequency portions of the image extend over a field of view 88. Adjacent to lateral edges of the field of view, peripheral regions 84 are defined. These peripheral regions 84 will correspond to regions filtered through the various processing steps discussed with reference to FIG. 2, at transition regions of the cumulative filtering performed, primarily in the continuous domain. Depending upon the width of the image and the quality of the filtering, peripheral regions 84 will have widths equal to several percent of the field of view width as indicated by reference numerals 86. In conventional imaging systems, such regions are suppressed, narrowing the field of view to the width indicated by reference numeral 88. By the additional processing described below, the field of view is expanded to include at least a portion of the peripheral regions 84.

Figure 4:
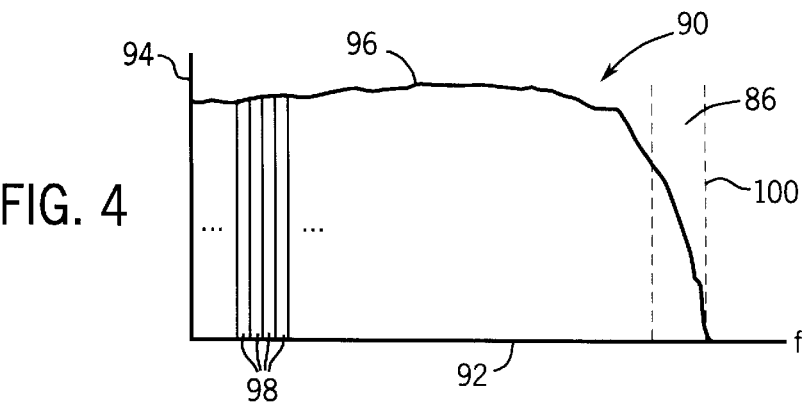
FIG. 4 is a graphical representation of exemplary raw image data acquired over a frequency range prior to filtration.

FIG. 4 illustrates exemplary data acquired in an image data acquisition sequence displayed over a frequency band, such as a frequency from the center line of the image in FIG. 3 through the high frequency region 78. FIG. 4 represents one set of image data that will be collected in k-space, following transformation in the frequency domain. As will be appreciated by those skilled in the art, in a typical MRI data acquisition sequence, a series of such data sets is collected corresponding to horizontal rows of pixels in the reconstructed image. As shown in FIG. 4, the line of image data may typically constitute a continuous curve 90 which may be displayed over the sensed frequency range as indicated by axis 92. Over the range 92 the data varies in amplitude as indicated by vertical axis 94. Data represented by curve 90 will typically extend over a primary region 96 which will define a portion of the field of view as illustrated in the exemplary image of FIG. 3 to the right of the image center line. When the data is converted from analog form to digital form, the frequencies over which the data extends will be attributed discrete values, saved in "discrete value bins" as indicated by reference numeral 98 in FIG. 4. These value bins will have magnitude levels as indicated by their corresponding height along axis 94. Primary region 90 is bound by transition region 86 which may generally be considered to extend between transition region limits 100.

Figure 5:
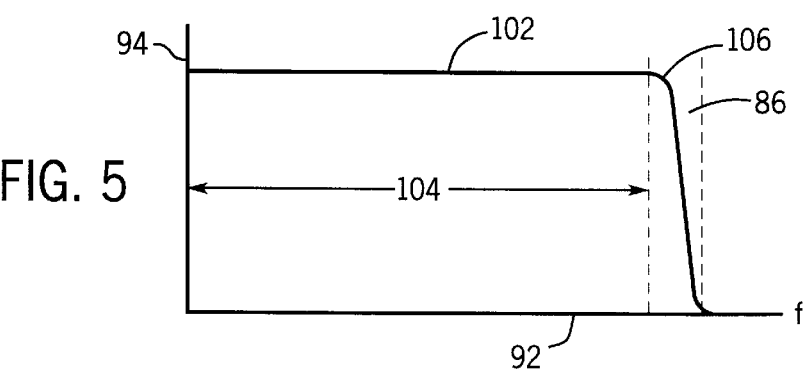
FIG. 5 is a graphical representation of a combination discrete and continuous domain filter system over the frequency range of the data of FIG. 4.

FIG. 5 represents an exemplary curve of cumulative filter values applied to the data of FIG. 4 through the processing steps summarized in FIG. 2. A shown in FIG. 5, the filter curve 102 may be represented over the frequency range along axis 92, and will have predetermined values measured along vertical axis 94. It should be noted that the exemplary curve of FIG. 5 represents the overall cumulative filtration values applied during the various filtering steps of FIG. 2. Also, while the filter curve of FIG. 5 and the data of FIG. 4 are illustrated as extending over a predetermined frequency bandwidth, it should be noted that certain filtration steps resulting in the curve of FIG. 5 are executed on the data in the time domain. In the illustration of FIG. 5, curve 102 has a generally linear section extending over a frequency bandwidth 104 corresponding generally to the primary region 96 of FIG. 4. Moreover, a corner or roll off portion region 106 borders the bandwidth 104 in a location corresponding generally to transition region 86. The roll off of values of the filter as represented by curve 102 in the transition region 86 may be due to various factors, such as physical limits of analog components employed in the filtering and signal processing circuitry.

Figure 6:
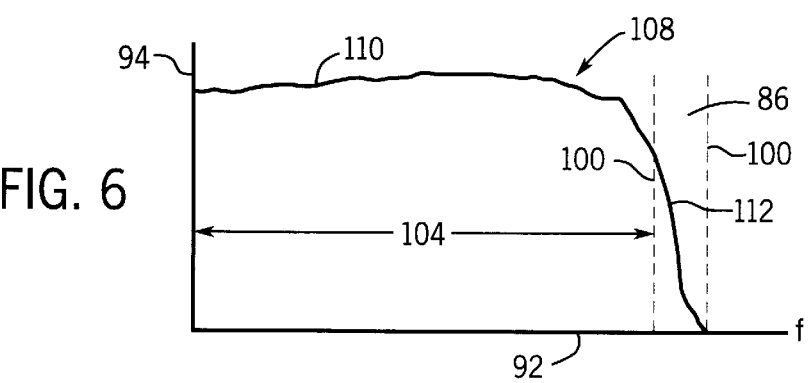
FIG. 6 is a graphical representation of the data of FIG. 4 processed via the filter of FIG. 5.

FIG. 6 represents a filtered data curve 108 generated by combination of the filter values of curve 102 with the image data values of curve 90. As shown in FIG. 6, the resulting filtered image data includes useful image data represented generally by the reference numeral 110 extending over the frequency bandwidth 104. Within transition region limits 100, transition region data 112 declines rapidly in magnitude due to both the decline in the original raw image data and particularly to the net filtering values applied in the signal processing as represented in FIG. 5. In conventional imaging systems, transition region data 112 is discarded, thereby reducing the field of view on either side of the image centerline to the bandwidth represented by reference number 104. It should be noted that the foregoing filtering is illustrated only for one side of the image, corresponding to higher frequency region 78 in FIG. 3. However, similar filtering and data processing is performed for the lower frequency region 80 of FIG. 3.

Figure 7:
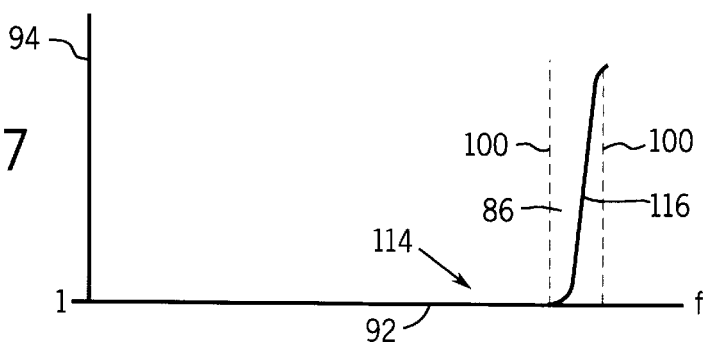
FIG. 7 is a graphical representation of a discrete data correction filter for processing a portion of the data of FIG. 6 in a transition region.

FIG. 7 represents a correction filter curve 114 for expanding the field of view by correction of at least a portion of transition region data 112 of FIG. 6. Correction filter 114 has a value of unity extending over the frequency bandwidth outside of the transition region limits 100. Between the transition region limits the correction filter includes an increasing gain portion 116 which is preferably the inverse of the values of filter curve 102 within the same region. Thus, values of correction filter 114 within increasing gain portion 116 may be combined with (i.e. multiplied by) corresponding frequency bin values of filter curve 102 to obtain a net filtering gain approximating the gain applied over frequency bandwidth 104 of FIG. 5.

The correction filter 114 illustrated graphically in FIG. 7 is preferably implemented by appropriate code executed by image data processing circuitry 36 of FIG. 1. In a presently preferred configuration, the overall filtration gains shown in FIG. 5 are determined during configuration of the system, and the values of correction filter 114 are similarly determined and stored in memory circuitry 38 of FIG. 1. Thereafter, following the signal processing steps shown in FIG. 2, the gains of the correction filter 114 are applied to the lines of processed image data to compensate for the roll off of the overall filter gains in the transition region.

Figure 8:
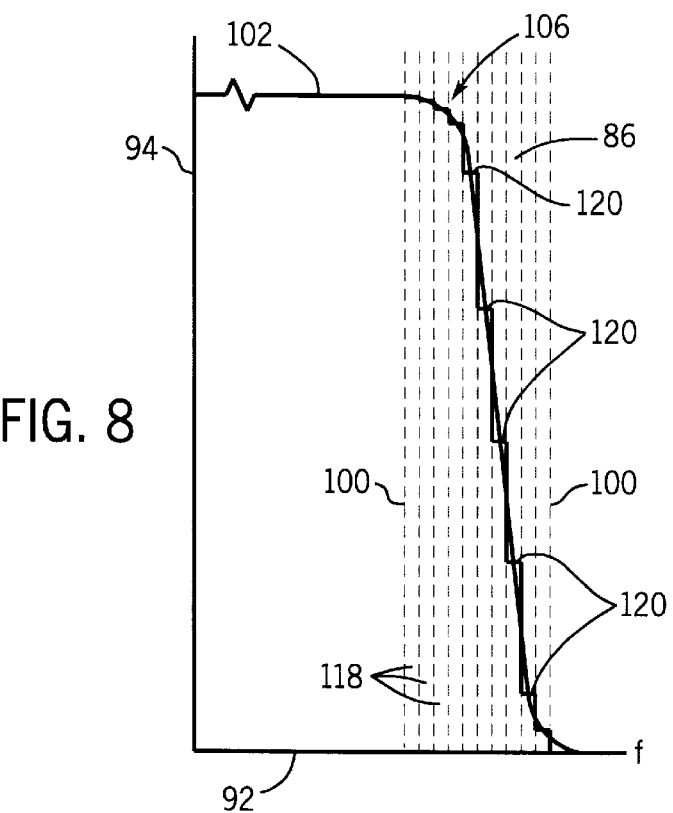
FIG. 8 is an enlarged graphical representation of a portion of the filter of FIG. 5 in the transition region.
Figure 9:
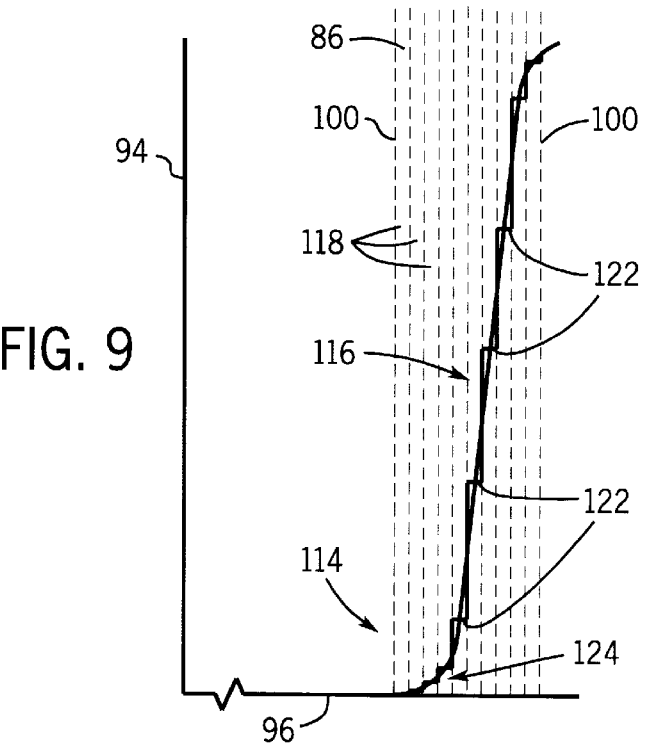
FIG. 9 is an enlarged graphical representation of the correction filter of FIG. 7 in the same transition region.

FIG. 8 and FIG. 9 illustrate the stepwise profile used as the basis for determining the values of the correction filter. In particular, FIG. 8 represents the gain values of filter curve 102 in transition region 86. The gain values decline within the transition region between limits 100. Values for the gains are estimated for each discrete frequency value bin 118 within the transition region. The resulting values, represented by reference numeral 120 in FIG. 8, are used to generate the correction of filter values for the similar region.

FIG. 9 represents the discrete values implemented in the correction filter to compensate for the decline in filter values shown in FIG. 8. In particular, each discrete frequency value bin 118 is assigned a correction value 122 approximating a smooth curve of the increasing gain portion 116 of the correction filter. An initial region 124 corresponds to the initial decline or roll off 106 of the filter curve, with subsequent values rising sharply to mirror the decline in the filter curve values.

According to the present technique, the discrete values 122 of the correction filter are multiplied by the corresponding discrete values of the processed filtered data within the transition region as indicated by reference number 112 in FIG. 6. Some or all of the resulting value bins may be displayed in the reconstructed image, thereby extending the image field of view over at least a portion of the transition region. As noted above, similar correction is performed on a lower frequency side of the image, thereby expanding the field of view on both sides of the image centerline. In a typical image, for example, the transition region may consist of 10 discrete value bins of a total frequency range divided into 256 such bins. The resulting correction may, therefore, extend the field of view by as much as several percent.

The foregoing technique permits the useful field of view of a processed discrete pixel image to be expanded and balanced with such factors as aliasing, signal-to-noise ratio, and so forth. In particular, prior to the correction described above, the image has a generally uniform brightness over the reduced field of view, with a significant decrease in brightness over the transition regions. By correcting at least some of the frequency value bins in the transition region, a more uniform brightness is obtained over the expanded field of view. As will be appreciated by those skilled in the art, the brightness uniformity and expanded field of view are balanced against a higher potential for aliasing and a lower signal-to-noise ratio over the expanded image. Moreover, as will be apparent to those skilled in the art, the foregoing technique permits rolloff of the overall filtration applied to the acquired image data to be compensated in a straightforward manner. Consequently, lower tolerance continuous domain filters may be employed, with enhancement of the image field of view provided, at least in part, by the gain corrections or coefficients implemented in the correction processing step.

What is claimed is:

1. A method for correcting discrete pixel image data, the method comprising the steps of:

filtering acquired image data through at least one continuous domain filter to produce filtered data;

compiling the filtered data into discrete value bins, the discrete value bins including a primary region and a transition region, the transition region being at least partially defined by a non-linear region of the continuous domain filter; and applying a plurality of correction gains to values of discrete value bins in the transition region.

2. The method of claim 1, wherein the correction gains are determined based upon gains of the at least one continuous domain filter in the transition region.

3. The method of claim 1, wherein the at least one continuous domain filter is applied to time domain image data.

4. The method of claim 3, wherein the filtered data is converted from an analog form to a digital form following filtering by the at least one continuous domain filter.

5. The method of claim 1, wherein the image data is filtered by at least one discrete domain filter prior to compiling the filtered data into the discrete value bins, and wherein the correction gains correct for a combined filtration effect of the at least one continuous domain filter and the at least one discrete filter.

6. The method of claim 1, wherein the filtered data is time domain data and the time domain data is converted to frequency domain data by inverse Fourier transformation prior to application of the correction gains.

7. The method of claim 1, wherein the discrete value bins include a pair of transition regions, and wherein correction gains are applied to values of discrete value bins of both transition regions.

8. A method for enhancing a field of view of a discrete pixel image, the method comprising the steps of:

acquiring a set of image data;

filtering the image data through at least one continuous domain filter, the at least one continuous domain filter including a transition region of reduced gain;

digitizing the filtered image data into a plurality of value bins corresponding to an image field of view, value bins at a limit of the field of view corresponding to the transition region; and applying correction gains to digitized image data in value bins of the transition region.

9. The method of claim 8, wherein the image data is acquired in the time domain and is converted to the frequency domain, the value bins corresponding to frequencies over a bandwidth defining the field of view.

10. The method of claim 9, wherein the image data is converted to the frequency domain by application of a two dimensional Fourier transform to the time domain image data.

11. The method of claim 8, wherein correction gains are applied to image data on lower and higher frequency transition regions corresponding to opposite sides of the field of view.

12. The method of claim 8, wherein the correction gains are determined based upon gains of the at least one continuous domain filter in the transition region.

13. The method of claim 12, wherein the correction gains are determined based upon overall gains of a plurality of filters.

14. The method of claim 8, wherein the image data is filtered by at least one discrete domain filter following the step of digitizing the filtered image data, and wherein the correction gains correct for a combined filter effect of the at least one continuous domain filter and the at least one discrete domain filter.

15. A method for correcting discrete pixel image data, the method comprising the steps of:

acquiring image data in a time domain;

filtering the acquired image data through at least one continuous domain filter to produce filtered data;

transforming the filtered data to a frequency domain; and applying correction gains to the filtered data in the frequency domain to produce image data of substantially uniform brightness over an effective field of view.

16. The method of claim 15, wherein the filtered data is converted to a discrete domain prior to application of the correction gains.

17. The method of claim 16, wherein the filtered data is further filtered in the discrete domain through at least one continuous domain filter, and the correction gains render a substantially uniform brightness over the effective field of view to correct for combined filtration of the at least one continuous domain filter and the at least one discrete domain filter.

18. A system for correcting a portion of filtered discrete pixel image data, the data extending over a range having a primary region and a transition region adjacent to an edge of the primary region, the transition region including a plurality of discrete value bins, the system comprising:

a memory circuit for storing a plurality of discrete gains corresponding to the discrete value bins of the transition region; and a filter circuit configured to combine the image data of the transition region with the discrete gains to correct values of the discrete value bins of the transition region.

19. The system of claim 18, wherein the discrete gains are predetermined based upon gains of at least one data filter in the transition region.

20. The system of claim 19, wherein values of the discrete gains stored in the memory circuit increase with distance of the corresponding value bins from the edge of the primary region.

21. The system of claim 18, wherein the filter circuit is configured in a digital signal processing circuit.

22. The system of claim 18, wherein the filter circuit is configured to multiply filtered image data by the discrete gains stored in the memory circuit.

23. The system of claim 18, wherein discrete gains are stored and combined all discrete value bins of the transition region.

24. The system of claim 18, wherein discrete gain values are stored in the memory circuit and are combined by the filter circuit for correcting values of discrete value bins for two transition regions adjacent to two edges of the image data range.

25. An expanded field of view image produced by a method that includes the steps of:

acquiring image signals;

filtering the image signals to produce primary field of view data and transition region data, the transition region data corresponding to a portion of the image at an edge of a field of view; and multiplying the transition region data by predetermined gains to expand the field of view of the image.

26. The image of claim 25, wherein the transition region data includes a plurality of discrete values stored in a memory circuit, and a predetermined gain is multiplied by each discrete value.

27. The image of claim 25, wherein the image signals are acquired in the time domain and converted to the frequency domain prior to multiplying the transition region data by the predetermined gains.

28. The image of claim 25, wherein the image signals are acquired in the continuous domain, filtered in the continuous domain, and converted to the discrete domain prior to multiplying the transition region data by the predetermined gains.

29. The image of claim 25, wherein the step of multiplying the transition region data by the predetermined gains expands the field of view by at least approximately 3 percent.

* * * * *